United States Patent
Seymour et al.

(10) Patent No.: US 12,173,735 B2
(45) Date of Patent: Dec. 24, 2024

(54) VORTEX SUPPRESSION DEVICE

(71) Applicant: HALDATEC PTY LTD, Mitcham (AU)

(72) Inventors: Cameron Seymour, Mitcham (AU); Nishal Matara, Mitcham (AU); Adam Dobbs, Mitcham (AU)

( * ) Notice: Subject to any disclaimer, the term of this patent is extended or adjusted under 35 U.S.C. 154(b) by 221 days.

(21) Appl. No.: 17/770,230

(22) PCT Filed: Oct. 22, 2020

(86) PCT No.: PCT/AU2020/051139
§ 371 (c)(1),
(2) Date: Apr. 19, 2022

(87) PCT Pub. No.: WO2021/077167
PCT Pub. Date: Apr. 29, 2021

(65) Prior Publication Data
US 2022/0397136 A1    Dec. 15, 2022

(30) Foreign Application Priority Data

Oct. 23, 2019   (AU) ................................ 2019903991
Oct. 1, 2020    (AU) ................................ 2020903556

(51) Int. Cl.
*F15D 1/00*      (2006.01)
*E21B 49/08*     (2006.01)
(Continued)

(52) U.S. Cl.
CPC .......... *F15D 1/0055* (2013.01); *E21B 49/081* (2013.01); *F15D 1/004* (2013.01);
(Continued)

(58) Field of Classification Search
CPC .......... F15D 1/004; F15D 1/0055; F15D 1/12; F15D 1/14; G01N 1/2035; G01N 2001/205
(Continued)

(56) References Cited

U.S. PATENT DOCUMENTS 2,078,854 A * 4/1937 Jones .................... B64C 21/025
                                                    244/208
2,507,611 A * 5/1950 Pappas .................. B64C 21/025
                                                    244/198
(Continued)

FOREIGN PATENT DOCUMENTS

GB    2433122 A      6/2007
WO    2011157467 A1  12/2011

OTHER PUBLICATIONS

Wikipedia web page document: Vortex shedding (https://en.wikipedia.org/wiki/Vortex_shedding (Year: 2024).*

*Primary Examiner* — John Fitzgerald
(74) *Attorney, Agent, or Firm* — David Guerra (57) ABSTRACT

A vortex suppression device (10) for a fluid flowing along a pathway (A-E), including: an elongate body with an outer surface having an elongate leading section and an elongate trailing section along the length of the elongate body, in relation to a direction of fluid flow (A-E) when the device is located in the pathway, the elongate body having at least one channel (24a-24d, 26a, 26b) which extends from the elongate leading section to the elongate trailing section of the elongate body, the channel (24a-24d, 26a, 26b) being configured so that in use, when the device is in the pathway, the channel (24a-24d, 26a, 26b) allows fluid flow (J) towards the trailing section that disrupts the formation of vortices (D).

14 Claims, 5 Drawing Sheets

(51) Int. Cl.
*F15D 1/12* (2006.01)
*F15D 1/14* (2006.01)
*G01N 1/20* (2006.01)
*G01N 17/04* (2006.01)

(52) U.S. Cl.
CPC .............. *F15D 1/12* (2013.01); *F15D 1/14* (2013.01); *G01N 1/2035* (2013.01); *G01N 17/043* (2013.01); *G01N 2001/205* (2013.01)

(58) Field of Classification Search
USPC .............................................. 138/39; 244/130
See application file for complete search history.

(56) References Cited

U.S. PATENT DOCUMENTS

| | | | | |
|---|---|---|---|---|
| 3,055,614 | A * | 9/1962 | Thompson | B64C 23/005 244/15 |
| 3,262,658 | A * | 7/1966 | Reilly | B64C 23/00 244/207 |
| 3,298,636 | A * | 1/1967 | Arnholdt | B64C 23/005 244/198 |
| 3,441,236 | A * | 4/1969 | Arnholdt | B64D 15/02 244/204 |
| 3,507,463 | A * | 4/1970 | Kuntz | B64C 29/005 244/55 |
| 4,823,615 | A * | 4/1989 | Taha | G01F 1/46 73/861.66 |
| 4,991,976 | A | 2/1991 | Byles | |
| 6,464,171 | B2 * | 10/2002 | Ruffin | B64C 30/00 244/210 |
| 6,644,894 | B2 * | 11/2003 | Shu | B63B 1/32 166/359 |
| 6,896,447 | B1 * | 5/2005 | Taquino | F16L 1/123 405/211 |
| 7,096,749 | B2 * | 8/2006 | Schimmoller | G01N 1/2273 73/864.31 |
| 7,143,983 | B2 * | 12/2006 | McClure | B64C 15/14 244/90 A |
| 7,836,780 | B2 | 11/2010 | Garnett et al. | |
| 8,579,546 | B2 * | 11/2013 | Masters | B29C 45/14622 405/216 |
| 9,188,489 | B2 | 11/2015 | Kleven | |
| 9,322,221 | B2 * | 4/2016 | Howard | B29C 39/026 |
| 9,567,745 | B2 * | 2/2017 | Moeller | F03D 13/20 |
| 9,631,518 | B2 * | 4/2017 | Wong | F01D 25/30 |
| 9,631,624 | B2 * | 4/2017 | Wong | F04D 19/022 |
| 9,845,644 | B2 * | 12/2017 | Howard | F16L 1/24 |
| 2002/0066570 | A1 * | 6/2002 | Shu | E21B 17/015 166/65.1 |
| 2003/0150962 | A1 * | 8/2003 | Orban | B64C 21/025 244/209 |
| 2007/0003372 | A1 * | 1/2007 | Allen | E02D 27/52 405/211 |
| 2008/0031306 | A1 | 2/2008 | Yamada et al. | |
| 2008/0257011 | A1 * | 10/2008 | Sahibzada | G01N 33/0009 73/19.12 |
| 2009/0211368 | A1 * | 8/2009 | Garnett | G01F 1/46 73/861.65 |
| 2011/0229329 | A1 * | 9/2011 | Occhipinti | B64C 21/025 416/223 R |
| 2014/0205448 | A1 * | 7/2014 | Wong | F04D 19/022 415/207 |
| 2016/0177922 | A1 * | 6/2016 | Zamora Rodriguez | F03D 1/0675 416/37 |
| 2016/0230476 | A1 * | 8/2016 | Howard | B29C 66/5324 |

* cited by examiner

*Figure 1*

SECTION A-A

VORTEX SUPPRESSION DEVICE

CROSS-REFERENCE TO RELATED APPLICATIONS

This application is an U.S. national phase application under 35 U.S.C. § 371 based upon co-pending International Application No. PCT/AU2020/051139 filed on Oct. 22, 2020. Additionally, this U.S. national phase application claims the benefit of priority of co-pending International Application No. PCT/AU2020/051139 filed on Oct. 22, 2020, Australian Application No. 2019903991 filed on Oct. 23, 2019 and Australian Application No. 2020903556 filed on Oct. 1, 2020. The entire disclosures of the prior applications are incorporated herein by reference. The international application was published on Apr. 29, 2021 under Publication No. WO 2021/077167 A1.

TECHNICAL FIELD

The present invention relates to a vortex suppression device.

The present invention relates particularly, although by no means exclusively, to an instrument for inserting into a pipeline including a vortex suppression device.

BACKGROUND OF THE INVENTION

In certain industries, such as the oil and gas industry, it is a requirement to periodically insert instruments inside a flowing stream, such as in a flowing process pipeline, to perform a variety of different tasks. Some of these tasks may include: sampling; injection; measurement; and corrosion monitoring.

An instrument for inserting into pipelines may include: a sample probe; a pipeline injector; a corrosion coupon, or any other sensors for determining the properties of the fluid.

Whilst the instruments involved in each of these tasks have a specific purpose, the overall intention is to undertake product quality control and to control/monitor pipeline integrity. The results of the analysis provide the operators of the pipeline with the necessary information to meet product specifications.

To perform any of the aforementioned tasks accurately, it is critical to insert an instrument inside a process pipeline during the production process. However, it is undesirable for the inserted instrument to interfere with the production process, such as fluid flow in the pipelines.

Inserting an instrument inside a process pipeline during a production process involves inserting the instrument inside the pipeline while the product is flowing in the pipeline.

Instruments for inserting into pipelines are typically cylindrical shaped. These instruments are generally inserted in a fixed position such that the flow of fluid travels transverse to a longitudinal axis of the instrument.

When a cylinder is introduced into a flow of fluid travelling transverse to a longitudinal axis of the cylinder, the flow decelerates as it impacts an outer surface of the cylinder. The elongate section of the outer surface of the cylinder at which flow first impacts the outer surface of the cylinder is also known as the "leading section" (or the "leading edge") of the cylinder. The flow separates at the leading section and travels in opposite directions around the cylinder. As the flow travels around the cylinder it accelerates until it reaches a maximum velocity area. Beyond this point, the flow decelerates as it travels around the cylinder to a second low-velocity area where the flow rejoins and/or leaves the outer surface of the cylinder. The elongate section on the cylinder at which flow rejoins and/or leaves the outer surface of the cylinder is also known as the "trailing section" (or the "trailing edge") of the cylinder.

The change in fluid velocity around the cylinder effects the pressure gradient around the cylinder according to Bernoulli's principle. The pressure gradient around the cylinder is determined by the flow regime in which the hydraulic system is operating in. Under certain flow regimes, the static pressure around the cylinder may be high enough to produce an adverse pressure gradient, i.e. one that acts against the direction of flow. This adverse pressure gradient causes recirculation of flow which results in separation of boundary layer flow from the cylinder. The flow that is separated can form vortices that shed asymmetrically (i.e. alternative shedding of vortices) in the wake of the cylinder.

The Reynolds number (Re) is a dimensionless parameter which can be used to categorize the flow regime in which a fluid flow is operating in. The Reynolds number can be considered a ratio of viscous forces to inertial forces. For low Reynolds numbers (Re<10) the flow conditions around the cylinder can be considered laminar, meaning the viscous forces are dominant and a boundary layer of low velocity fluid surrounds the cylinder. For Reynolds numbers of Re=~10, inertial forces begin to dominate and the boundary layer surrounding the cylinder begins to separate and form vortices in the wake of the cylinder. With increases in Reynolds number (Re>~90) the flow pattern around the body becomes asymmetric and the low-pressure zone moves across the surface of the cylinder resulting in alternate shedding of vortices, also known as a Kármán vortex street. The shedding of vortices continues until fully turbulent flow conditions are reached at around Re~$10^5$.

The alternate shedding of vortices produces an oscillatory force also known as vortex induced vibration (VIV). The magnitude and frequency of the VIV can result in damage to the inserted instrument which can also affect downstream equipment, and/or the pipeline itself. This is especially true for frequencies of vibration which match the resonant frequency of the inserted instrument.

The present invention seeks to address the issues associated with vortex induced vibration, or to at least provide the consumer with a useful alternative.

SUMMARY OF THE DISCLOSURE

In general terms, in a first aspect there is disclosed a vortex suppression device for fluid flowing along a pathway, including: an elongate body with an outer surface having an elongate leading section and an elongate trailing section along the length of the elongate body, in relation to a direction of fluid flow when the device is located in the pathway, the elongate body having at least one channel which extends from the leading section to the trailing section of the elongate body, the channel being configured so that in use, when the device is in the pathway, the channel allows fluid flow towards the trailing section that disrupts the formation of vortices.

In more particular terms, in a first aspect there is disclosed a vortex suppression device for fluid flowing along a pathway, including: an elongate body with an outer surface having an elongate leading section and an elongate trailing section along the length of the elongate body, in relation to a direction of fluid flow when the device is located in the pathway, the elongate body having at least one channel which extends transversely to a longitudinal axis of the elongate body from the leading section to the trailing section of the elongate body, the channel being configured so that in use, when the device is in the pathway, the channel allows fluid flow towards the trailing section that disrupts the formation of vortices.

The channel essentially directs high velocity fluid flow from upstream of the elongate body to downstream of the elongate body in order to reduce the static pressure downstream of the elongate body. Reducing the static pressure assists in preventing the formation of an adverse pressure gradient. This reduces the amount of boundary layer flow separation which, in turn, disrupts the formation of vortices.

In some embodiments, the elongate body has a circular or oval cross-section.

In some embodiments, the elongate body may also have a polygonal cross-section.

In some embodiments, the outer surface is dimpled or undulated. The dimples or undulations act to increase turbulent flow in the boundary layer, which assists in preventing boundary layer flow separation.

In some embodiments, the at least one channel comprises a groove in the outer surface of the elongate body.

In some embodiments, the groove follows a sinusoidal path around the elongate body.

In some embodiments, the groove follows a circumferential or helical path around the elongate body.

In some embodiments, the elongate body comprises a plurality of grooves, each groove following a sinusoidal path, circumferential path, or helical path. The grooves may share the same path shape of follow different paths. For example, the elongate body may have three grooves, two of the grooves follow a circumferential path and one of the grooves follows a sinusoidal path.

In some embodiments, the at least one channel extends through the elongate body.

In these embodiments, the at least one channel may have a rectangular cross-section having a width and a height, the width extending parallel to the longitudinal axis of the elongate body. The height of each channel may be greater than 1 mm. Suitably, the height of each channel may be between 2 mm and 4 mm. More suitably, the height of each channel may be 3 mm.

In some embodiments, the channel is offset from a centreline of the cross-section of the elongate body. The channel may be offset by a distance greater than 4.5 mm. Suitably, channel may be offset by a distance between 4.5 mm and 12 mm. More suitably, the channel may be offset by a distance of 6.5 mm or by 9.5 mm.

In some embodiments, the vortex suppression device has at least one opening in the outer surface of the elongate body. At least one of the channels may intersect with the at least one opening.

In some embodiments, the vortex suppression device has at least two diametrically opposed openings in the outer surface of the elongate body. The elongate body may include at least two channels, two of the channels each intersecting with openings in the outer surface of the elongate body.

In some embodiments, the elongate body includes at least four channels, two of the channels each intersecting with openings in the outer surface of the elongate body.

In some embodiments, the elongate body includes at least four channels all defined on a same plane lateral with a longitudinal axis of the elongate body, and wherein a first pair of the four channels each intersecting, perpendicularly, with an opening defined in the outer surface of the elongate body, and wherein a second pair of the four channels are defined interiorly of the first pair and do not intersect with any openings.

In some embodiments, each opening has a rectangular cross-section having a width and a height, the width extending parallel to the longitudinal axis of the elongate body. The height of each opening may be greater than 1 mm. Suitably, the height of each opening may be between 2 mm and 4 mm. More suitably, the height of each opening may be 3 mm.

In some embodiments, the elongate body is a sample probe having a first end and a second end and an internal passage extending between the first end and the second end for collecting fluid samples.

In some embodiments, the sample probe includes a threaded connection located at the second end for connecting the sample probe to an auxiliary piece of equipment.

In some embodiments, the sample probe includes a flow regulating arrangement located at the first end for regulating the flow of fluid into or out of the internal passage.

In some embodiments, the flow regulating arrangement is a valve and/or a filter.

In some embodiments of the vortex suppression device, the elongate body may include any one, or combination, of the following:
  a) a sample probe;
  b) an injection nozzle for the dispersion of liquids;
  c) a measurement device for determining fluid properties; or
  d) a corrosion coupon for monitoring pipeline corrosion.

BRIEF DESCRIPTION OF THE DRAWINGS

Notwithstanding any other forms which may fall within the scope of the device as set forth in the Summary, specific embodiments will now be described, by way of example only, with reference to the accompanying drawings in which:

FIGS. 9A to 9D are plan views of the vortex suppression device of FIG. 8 taken at 90 degree increments around the longitudinal axis of device, wherein.

DETAILED DESCRIPTION OF SPECIFIC EMBODIMENTS

The Figures show three embodiments of the vortex suppression device of the invention. It is noted that these are not the only embodiments.

Figure 1:
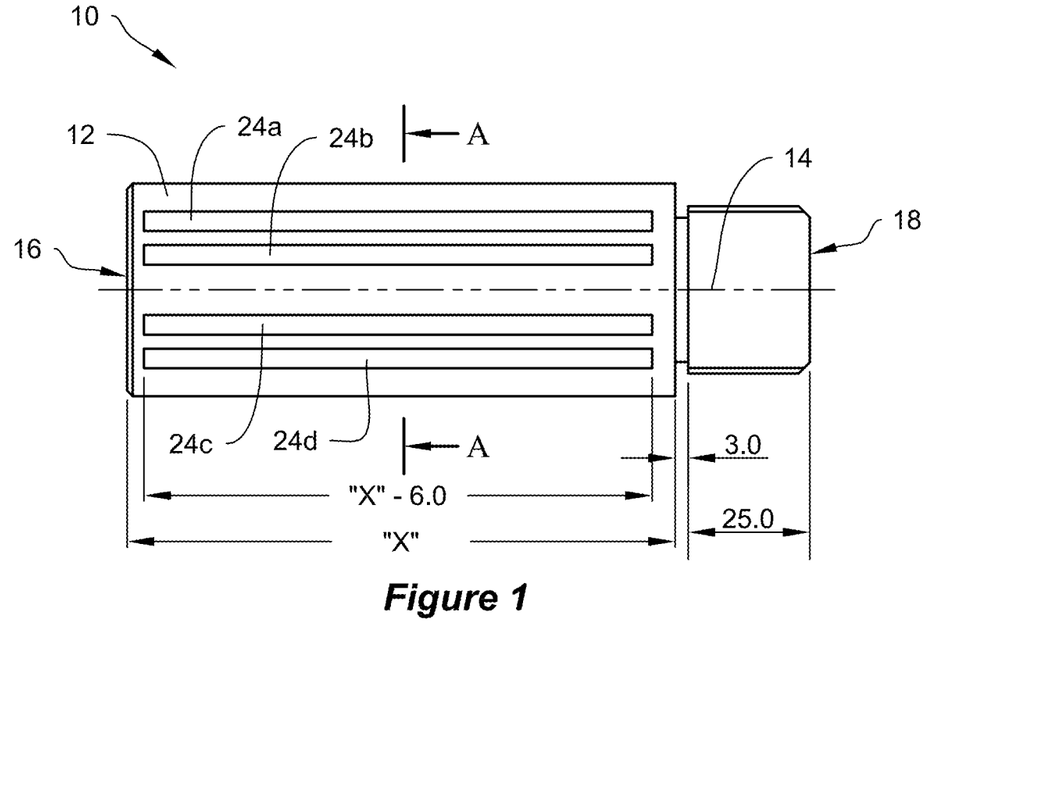
FIG. 1 is a front view of a vortex suppression device according to a first embodiment of the present invention.
Figure 2:
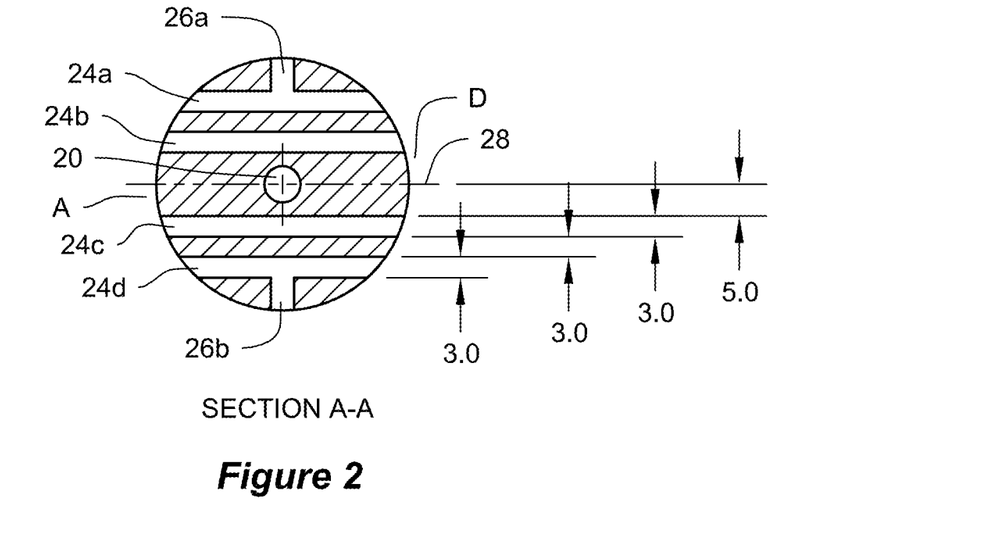
FIG. 2 is a cross-sectional view A-A of the vortex suppression device of FIG. 1.
Figure 3:
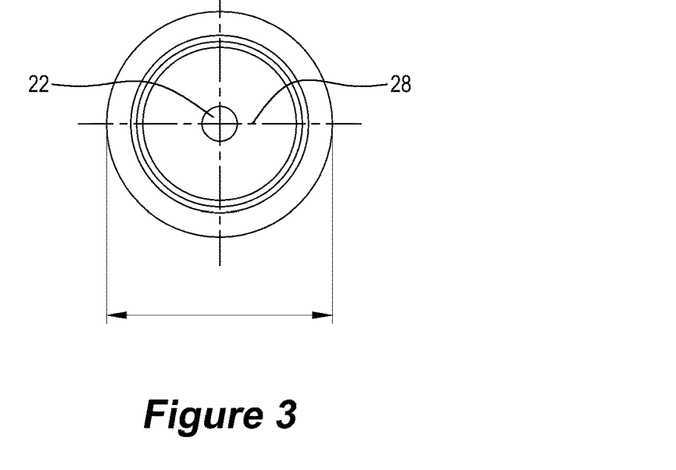
FIG. 3 is an end view of the vortex suppression device of FIG. 1.

Referring firstly to FIGS. 1 to 3, a first embodiment of the vortex suppression device is shown in the form of a sample probe 10 having a cylindrical shaped elongate body 12 with an outer surface defining a longitudinal axis 14. The elongate body 12 has a first end 16, a second end 18 and an internal sampling passage 20, extending between the first and second ends 16, 18, for collecting fluid samples (as shown in FIG. 2). The second end 18 has a male threaded connection for connecting the sample probe to an auxiliary piece of equipment. The first end 16 has an aperture 22 (as shown in FIG. 3) for receiving flow of fluid into the sampling passage 20.

As can be seen from FIG. 2, the elongate body 12 includes at least four channels 24*a*, 24*b*, 24*c*, 24*d* which extend transversely to the longitudinal axis 14 of the elongate body 12, through the elongate body 12.

When the sample probe 10 is positioned in a flow of fluid along a pathway (for example, see FIG. 5: fluid is flowing past the sample probe 10 in the direction of A to E), the outer surface defines an elongate leading section along the length of the sample probe 10 (for example, see FIG. 5: section of sample probe 10 local to area A) and an elongate trailing section along the length of the sample probe 10 (for example, see FIG. 5: section of the sample probe 10 local to Area D) in relation to a direction of fluid flow.

In use, the sample probe 10 is introduced to a fluid flow and oriented such that the longitudinal axis 14 is perpendicular to the direction of fluid flow and the channels 24*a*, 24*b*, 24*c*, 24*d* are aligned with the direction of fluid flow. In such an orientation, fluid flow enters these channels 24*a*, 24*b*, 24*c*, 24*d*, at the elongate leading section and flows through the elongate body 12 and exists the channels 24*a*, 24*b*, 24*c*, 24*d* at the elongate trailing section of the elongate body 12. High velocity fluid from the leading section of the elongate body 12 exists the channels at the trailing section of the elongate body 12 forming what is known as 'passive jets'. These 'passive jets' reduce the static pressure downstream of the elongate body which assists in preventing the formation of an adverse pressure gradient. This reduces the amount of boundary layer flow separation which, in turn, disrupts the formation of vortices.

FIG. 2. also shows two diametrically opposed openings 26*a*, 26*b* in the outer surface of the elongate body 12. A first pair of channels 24*a* and 24*d* intersect, perpendicularly, with two diametrically opposed openings 26*a*, 26*b*, respectively, to form 'passive jets' at multiple angles around the elongate body 12. A second pair of channels 24*b* and 24*c* are defined interiorly of the first pair of channels and do not intersect with any openings 26*a*, 26*b*.

The applicant has found that producing 'passive jets' at multiple angles around the elongate body 12 provides a more even pressure gradient around the elongate body 12. The channels 24*a*, 24*b*, 24*c*, 24*d* and openings 26*a*, 26*b* direct the high velocity fluid from the leading section of the elongate body 12 to the low-pressure area behind the trailing section of the elongate body 12 in order to restrict the transverse fluid motion around the elongate body 12 using the kinetic energy available in the flow. This not only reduces the boundary layer flow separation from the trailing section of the elongate body 12, but also reduces boundary layer flow separation from the elongate body 12 at other positions located between the leading section and the trailing section of the elongate body 12. The applicant has found that having more than one channel 24 reduces the severity of alternate shedding of vortices by increasing the kinetic energy available for vortex suppression at the trailing section of the elongate body 12.

FIG. 2 shows that the elongate body has a centreline 28 and that each of the channels 24*a*, 24*b*, 24*c*, 24*d* are offset from the centreline 28. A pair of channels 24*b*, 24*c* are offset by a distance typically greater than 4.5 mm. In the described embodiment the pair of channels 24*b*, 24*c* are offset by a distance of 6.5 mm and another pair of channels 24*a*, 24*d* are offset by a distance of 9.5 mm.

FIG. 1 shows that the channels 24*a*, 24*b*, 24*c*, 24*d* have a rectangular cross-section having a width and a height; the width extending parallel to the longitudinal axis 14 of the elongate body 12. The width of each of the channels 24*a*, 24*b*, 24*c*, 24*d* extends substantially the entire length of the elongate body 12 and the height of each the channels 24 is typically greater than 1 mm. In the described embodiment the height is 3 mm. It is advantageous for each of the channels 24*a*, 24*b*, 24*c*, 24*d* to have a constant cross-sectional size throughout its length in order to allow transfer of kinetic energy with minimal energy loss. In other words, it is typically undesirable to have any flow restrictions in the channels 24*a*, 24*b*, 24*c*, 24*d*.

Each of the openings 26*a*, 26*b* has a rectangular cross-section having a width and a height; the width extending parallel to the longitudinal axis 14 of the elongate body 12. The width of each of the openings 26*a*, 26*b* extends substantially the entire length of the elongate body 12 and the height of each of the openings 26*a*, 26*b* is typically greater than 1 mm. In the described embodiment the height is 3 mm. It is advantageous for each of the openings 26*a*, 26*b* to have a constant cross-section throughout its length in order to allow transfer of kinetic energy with minimal energy loss. In other words, it is typically undesirable to have any flow restrictions in the openings 26*a*, 26*b*.

FIG. 3 shows an end view of the first end 16 of the sample probe shown in FIG. 1. As can be seen from FIG. 3, the sample probe includes an aperture 22 which allows fluid flow to enter the sampling passage 20 and flow in a direction along the longitudinal axis 14 of the elongate body 12. The sampling passage 20 is used to obtain a sample from the fluid flow which can then be analysed to determine the properties of the fluid.

Figure 4:
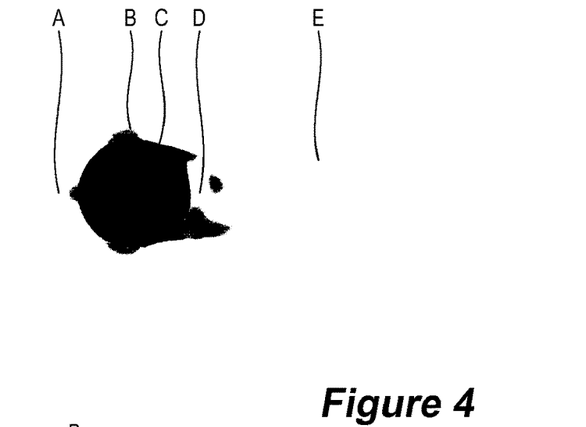
FIG. 4 is a velocity plot results of a computational flow simulation for flow around a cylinder.
Figure 5:
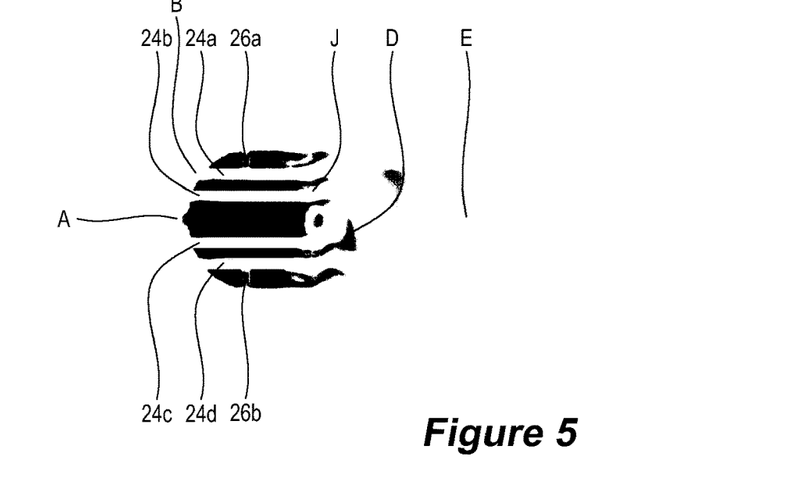
FIG. 5 is a velocity plot results of a computational flow simulation for flow around the vortex suppression device of FIG. 1.

FIGS. 4 and 5 are comparative velocity plot results of a computational flow simulation of flow around a cylinder C (as shown in FIG. 4) with and the vortex suppression device 10 of the present invention (as shown in FIG. 5). Both simulations used the same fluid flow conditions, i.e. the same Reynolds number.

FIG. 4 shows a cylinder C in a flow of fluid traveling from A-E. The flow decelerates as it impacts the leading section of the cylinder C and forms a low-velocity area A. The flow separates at the leading section and travels in opposite directions around the cylinder C. As the flow travels around the cylinder it accelerates until it reaches a maximum velocity area B. Beyond this point, the flow decelerates as it travels around the cylinder C to a second low-velocity area D. The change in fluid velocity around the cylinder effects the pressure gradient around the cylinder according to Bernoulli's principle. At areas of low-velocity, such as at area D, the static pressure is high enough to produce an adverse pressure gradient, i.e. one that acts against the direction of flow. This adverse pressure gradient causes recirculation of flow and ultimately separation of boundary layer flow from the cylinder C. The flow that is separated in area D produces alternate shedding of vortices E in the wake of the cylinder C, also known as a Kármán vortex street.

FIG. 5 shows the vortex suppression device 10 in a flow of fluid traveling from A-E. The flow decelerates as it impacts the leading section of the vortex suppression device 10 and forms a low-velocity area A. The flow separates at the leading section and travels in opposite directions around the vortex suppression device 10. As the flow travels around the vortex suppression device 10 it accelerates until it reaches a maximum velocity area B proximal to the entrances of the channels 24a-24d. The flow from the maximum velocity area B is then conducted along the channels 24a-24d and openings 26a, 26b to the trailing section of the vortex suppression device 10 to exit the channels 24a-24d and openings 26a, 26b as 'passive jets' J. The 'passive jets' J reduce the static pressure downstream of the vortex suppression device 10. Reducing the static pressure assists in preventing the formation of an adverse pressure gradient. This reduces the amount of boundary layer flow separation which, in turn, disrupts the formation of vortices. Furthermore, the channels 24a-24d also reduce the severity of alternate shedding of vortices, i.e. a Kármán vortex street, by constraining the movement of the low-pressure zone to between the channels 24a-24d.

Figure 6:
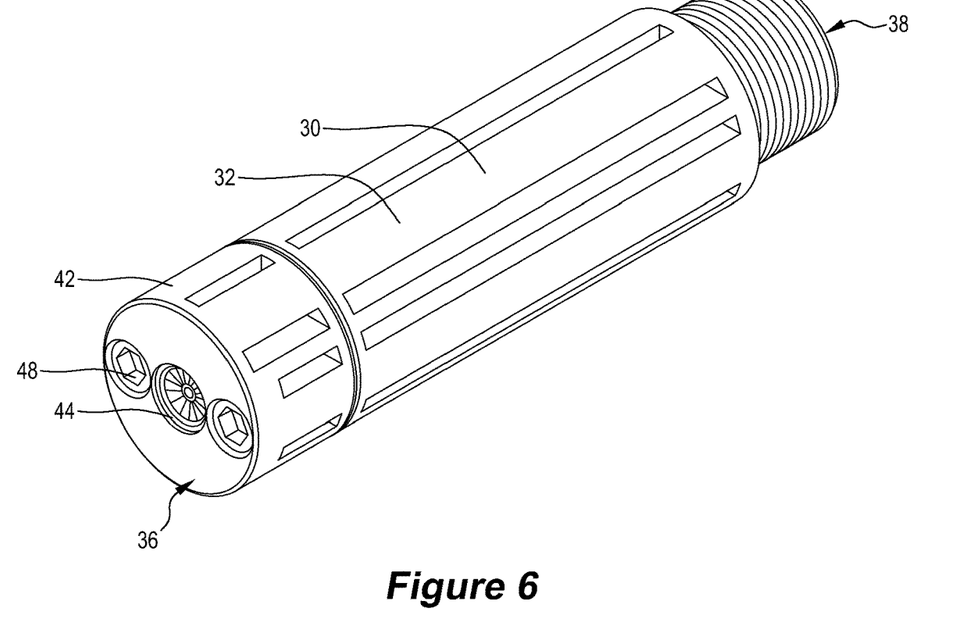
FIG. 6 is a perspective view of a vortex suppression device according to a second embodiment of the present invention.
Figure 7:
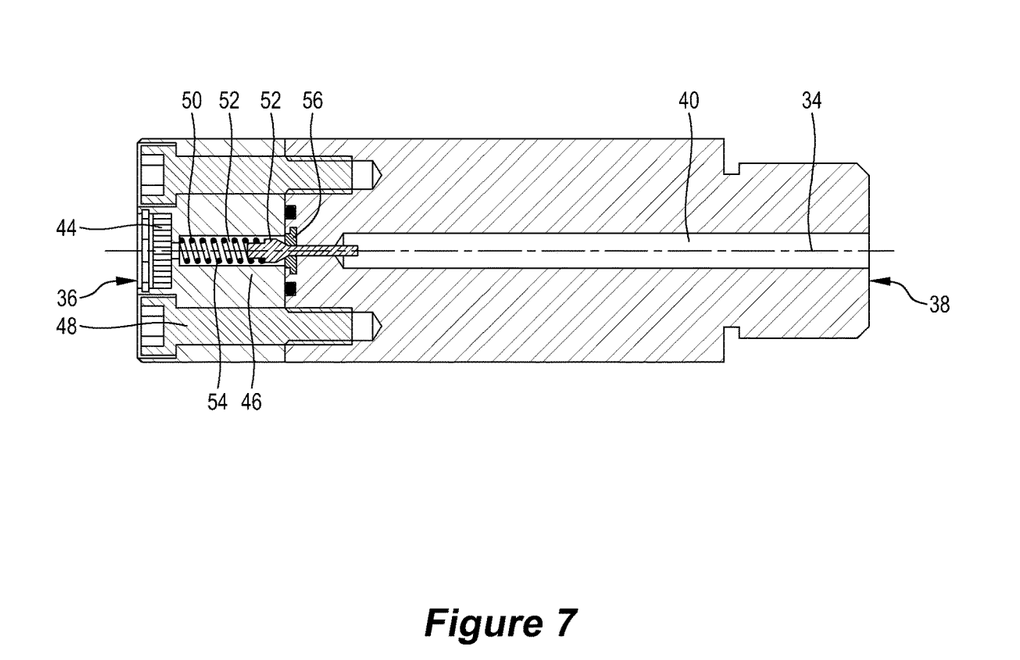
FIG. 7 is a cross-sectional view, along plane on the longitudinal axis, of the vortex suppression device shown in FIG. 6.

FIGS. 6 and 7 show a second embodiment of the vortex suppression device in the form of a different sample probe 30 having an elongate body 32 with, an outer surface defining a longitudinal axis 34, a first end 36, and a second end 38. Between the first and second ends 36, 38 is an internal sampling passage 40 for collecting fluid samples. The embodiment shown in FIGS. 6 and 7 operates in much the same way as the embodiment of FIG. 1. However, the first end 36 of the sample probe includes a flow regulating arrangement 42 for regulating the flow into/out of the sampling passage 40. The flow regulating arrangement 42 is a cylindrical component that is releasably attached to the first end 36 of the sample probe 30 by bolts 48. The flow regulating arrangement 42 also includes channels and openings as previously described in FIGS. 1 to 3.

As can be seen in FIG. 7, the flow regulating arrangement 42 comprises an internal passage 50 which aligns and fluidly communicates with the sampling passage 40. The internal passage 50 has an opening in which a filter 44, in the form of a perforated disc, is located. The filter 44 acts to prevent particles over a certain size from entering the internal passage 50. Inside the internal passage 50 is a valve arrangement 46 which comprises a poppet valve body 52 that is biased to rest on an annular valve seat 56 by a helical spring 54. The valve arrangement 46 regulates flow into/out of the sampling passage 40.

Figure 8:
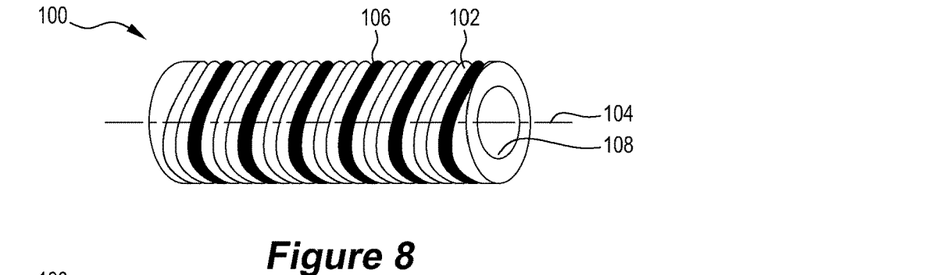
FIG. 8 is a perspective view of the vortex suppression device according to a third embodiment of the present invention.
Figure 9A:
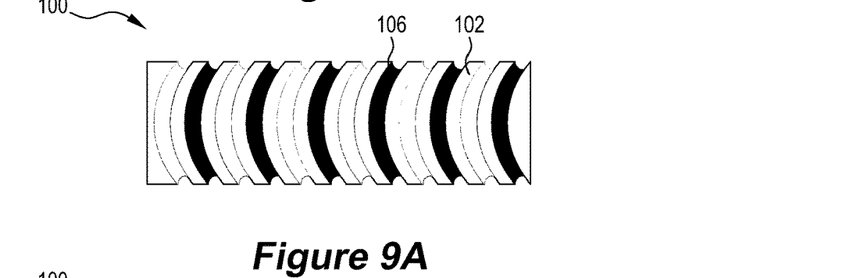
FIG. 9A is first plan view (at 0 degrees)
Figure 9B:
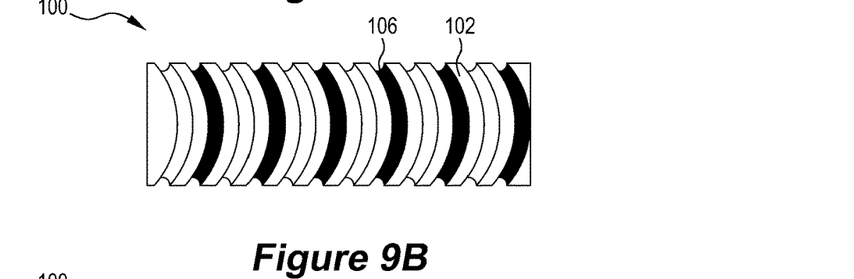
FIG. 9B is a second plan view (at 90 degrees)
Figure 9C:
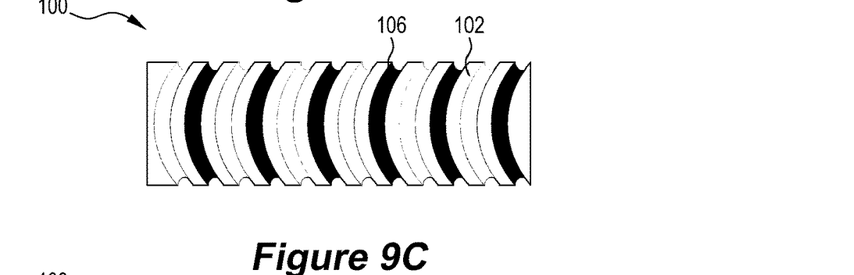
FIG. 9C is a third plan view (at 180 degrees)
Figure 9D:
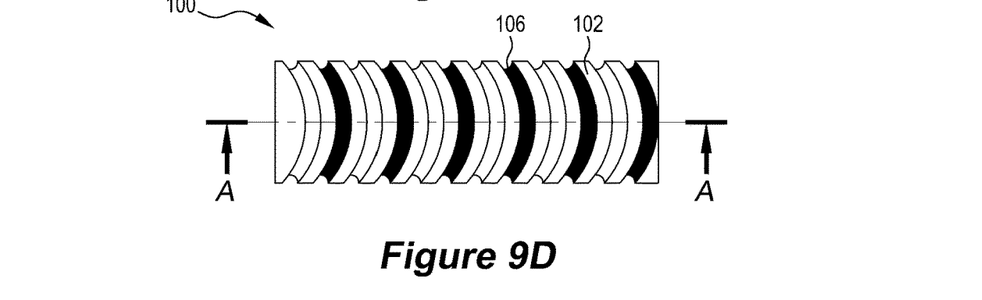
FIG. 9D is a fourth plan view (at 270 degrees)
Figure 10:
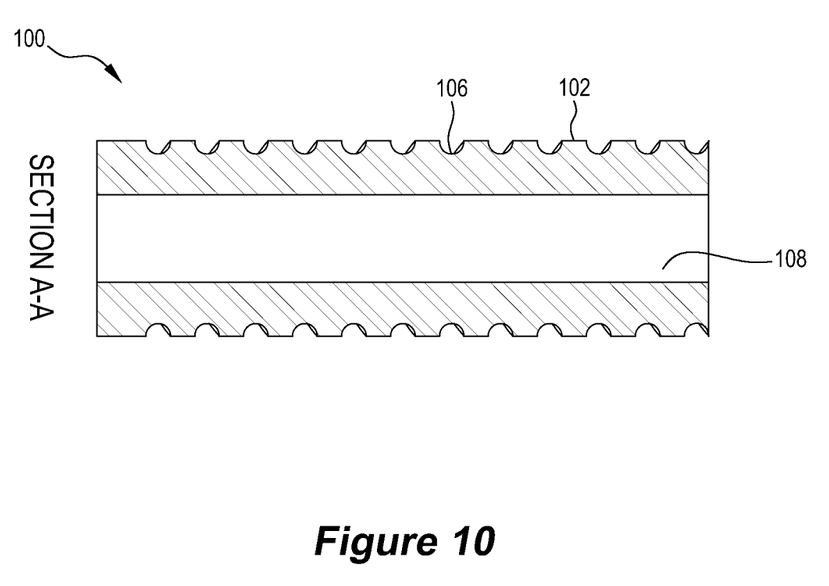
FIG. 10 is a cross-sectional view along the line A-A in FIG. 9D.

FIGS. 8 to 10 illustrate a third embodiment of the vortex suppression device in the form of a sample probe 100 having a cylindrical shaped elongate body 102 with an outer surface defining a longitudinal axis 104.

When the sample probe 100 is positioned in a fluid flow, the outer surface has an elongate leading section and an elongate trailing section in relation to a direction of fluid flow. The elongate body 102 has channels, in the form of circumferential grooves 106 that follow a sinusoidal path around the outer surface of the elongate body 102, which extend transversely to the longitudinal axis 104 of the elongate body 102 from the elongate leading section to the elongate trailing section of the elongate body 102. The grooves 106 are illustrated in alternating colours, blue and red. These colours are merely to distinguish one groove from the grooves that are adjacent to it. The grooves 106 reduce vortex induced vibration by conducting high velocity fluid flow from the leading section to the trailing section of the elongate body 102. The high velocity fluid at the trailing section reduces static pressure downstream of the elongate body 102. Reducing the static pressure assists in preventing the formation of an adverse pressure gradient. This reduces the amount of boundary layer flow separation, which in turn, disrupts the formation of vortices.

As can be appreciated, the sample probe 100 functions in the same manner as sample probes 10 and 30. However, unlike the sample probes 10 or 30, the sample probe 100 can be oriented at any angle, provided the fluid flow is travelling in a direction transversely to the longitudinal axis of the elongate body 102, without reducing its effectiveness at disrupting vortices. This is because the grooves 106 extend around the outer surface of the elongate body 102 rather than through the elongate body 102.

A further advantage of the sample probe 100, is that the circumferential grooves 106 transfer high velocity flow to the trailing section with greater efficiency than the channels/openings of sample probes 10 and 30. In other words, the high velocity flow is conducted to the tailing section with fewer and less severe directional changes. Severe directional changes should be avoided as they can result in energy losses. Because of this, the sample probe 100 can be made smaller than the sample probes 10 or 30, whilst providing the same vortex suppression capability. Reducing the size of the sample probe reduces materials and manufacturing costs.

In the embodiments previously discussed the elongate body 12, 32, 102 is shown to be cylindrical shaped. However, it is envisaged that elongate bodies of other shapes are within the scope of the invention.

The sample probes 10, 30, 100 can be made from any suitable material, preferably a corrosion resistant material, such as stainless steel, titanium, aluminum, brass . . . etc.

Whilst a number of specific embodiments have been described, it should be appreciated that the device may be embodied in many other forms. The invention has been described in the context of a sample probe, however, the invention should not be considered limited to this use. This invention is suitable for suppressing vortices produced as a result of an instrument being inserted into a flow of fluid. This invention is therefore suitable for other applications, for example flow meters, injection quills, siphons, corrosion coupon holders and thermowells.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

Further patent applications may be filed in Australia or overseas on the basis of, or claiming priority from, the present application. It is to be understood that the following provisional claims are provided by use of example only and are not intended to limit the scope of what may be claimed in any such future applications. Features may be added to or omitted from the provisional claims at a later date so is to further define or re-define the invention or inventions.

KEY

10: sample probe without regulation means
12: elongate body
14: longitudinal axis
16: first end
18: second end
20: sampling passage
22: aperture
24a-d: channel
26a,b: opening 28: centerline
30: sample probe with regulation means
32: elongate body
34: longitudinal axis
36: first end
38: second end
40: sampling passage
42: regulating arrangement
44: filter
46: valve arrangement
48: bolts
50: internal passage
52: valve body
54: spring
56: seat
100: vortex suppression device
102: elongate body
104: longitudinal axis
106: grooves
108: sampling passage

The invention claimed is:

1. A vortex suppression device for a fluid flowing along a pathway, the device comprising:
    an elongate body including an outer surface having an elongate leading section and an elongate trailing section along a length of the elongate body, in relation to a direction of fluid flow when the device is located in the pathway, the elongate body having at least four channels that extend from the leading section to the trailing section of the elongate body, the at least four channels all defined on a same plane lateral with a longitudinal axis of the elongate body, and wherein a first pair of the four channels each intersecting, perpendicularly, with an opening defined in the outer surface of the elongate body, and wherein a second pair of the four channels are defined interiorly of the first pair and do not intersect with any openings, the at least four channels being configured so that in use, when the device is in the pathway, the at least four channels allow fluid flow towards the trailing section that disrupts the formation of vortices;
    wherein the at least four channels extend through the elongate body.

2. The vortex suppression device of claim 1, wherein the elongate body has a circular or an oval cross-section.

3. The vortex suppression device of claim 1, wherein the first pair of channels are each offset from the centerline by a distance of greater than 8.5 mm.

4. The vortex suppression device of claim 1 further comprising an internal sampling passage extending between a first end and a second end of the elongate body, and wherein the first end has an aperture for receiving flow of the fluid into the sampling passage.

5. The vortex suppression device of claim 1, wherein the elongate body includes any one of or combination selected from the group consisting of a sample probe, an injection nozzle for dispersion of liquids, a measurement device for determining fluid properties, and a corrosion coupon for monitoring pipeline corrosion.

6. The vortex suppression device of claim 1, wherein the openings having a rectangular cross-section having a width and a height, the width extending parallel to the longitudinal axis of the elongate body.

7. The vortex suppression device of claim 6, wherein the height of each of the openings is greater than 1 mm.

8. The vortex suppression device of claim 1, wherein the elongate body is a sample probe includes a first end, a second end and an internal passage extending between the first end and the second end for collecting fluid samples.

9. The vortex suppression device of claim 8, wherein the sample probe comprises:
    a threaded connection located at the second end for connecting the sample probe to an auxiliary piece of equipment; and
    a flow regulating arrangement located at the first end for regulating the flow of fluid into or out of the internal passage.

10. The vortex suppression device of claim 9, wherein the flow regulating arrangement includes one selected from the group consisting of a valve, and a filter.

11. The vortex suppression device of claim 1, wherein the at least four channels have a rectangular cross-section having a width and a height, the width extending parallel to a longitudinal axis of the elongate body.

12. The vortex suppression device of claim 11, wherein the height of the at least four channels are greater than 1 mm.

13. The vortex suppression device of claim 12, wherein the at least four channels are offset from a centerline of a cross-sectional area of the elongate body.

14. The vortex suppression device of claim 13, wherein the second pair of channels are each offset by a distance greater than 4.5 mm.

* * * * *